A. F. STEPHENS.
MILKING APPARATUS.
APPLICATION FILED APR. 24, 1912.

1,073,538.

Patented Sept. 16, 1913.
4 SHEETS—SHEET 1.

WITNESSES:

INVENTOR
Aaron F. Stephens
BY
ATTORNEYS

A. F. STEPHENS.
MILKING APPARATUS.
APPLICATION FILED APR. 24, 1912.

1,073,538.

Patented Sept. 16, 1913.

WITNESSES

INVENTOR
Aaron F. Stephens
BY
ATTORNEYS

UNITED STATES PATENT OFFICE.

AARON F. STEPHENS, OF CANISTEO, NEW YORK.

MILKING APPARATUS.

1,073,538.  Specification of Letters Patent.  Patented Sept. 16, 1913.

Application filed April 24, 1912. Serial No. 692,774.

*To all whom it may concern:*

Be it known that I, AARON F. STEPHENS, a citizen of the United States, and a resident of Canisteo, in the county of Steuben and State of New York, have invented a new and Improved Milking Apparatus, of which the following is a full, clear, and exact description.

The invention relates to milking apparatus by which the milk is drawn by suction from the teats of the cow's udder.

The object of the invention is to provide a new and improved milking apparatus arranged to permit of milking simultaneously a large number of cows in sets of four, to allow an attendant to readily control the milking operation for each set of cows, to render the suction action on each cow intermittent, to prevent spilling or waste of the milk, and to permit of conveniently assembling and disassembling the parts with a view to keep the same clean and to maintain the apparatus in sanitary condition. For the purpose mentioned use is made of a main suction pipe connected with a large vacuum chamber and provided with a valve controlling a suction chamber adapted to receive the milk from the teats and to discharge the milk into a pail or other milk receiving receptacle, the valve being so arranged that an intermittent suction is produced in the chamber which alternates with the admission of air to the chamber and opening the suction chamber to discharge the milk into the milk receiving receptacle.

A practical embodiment of the invention is represented in the accompanying drawings forming a part of this specification, in which similar characters of reference indicate corresponding parts in all the views.

Figure 1:
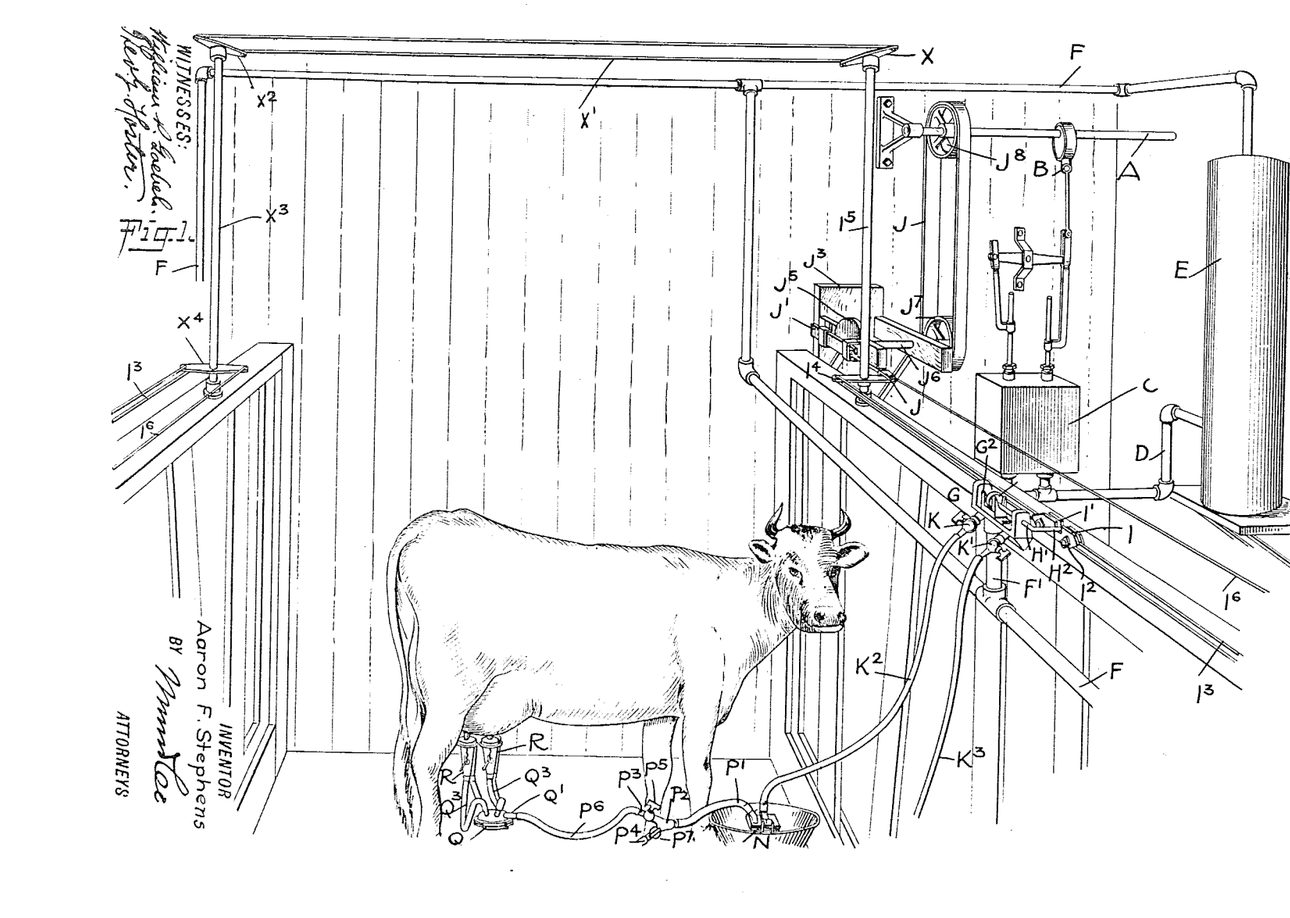
Figure 1 is a perspective view of the milking apparatus as applied.
Figures 6, 7, 8, 9:
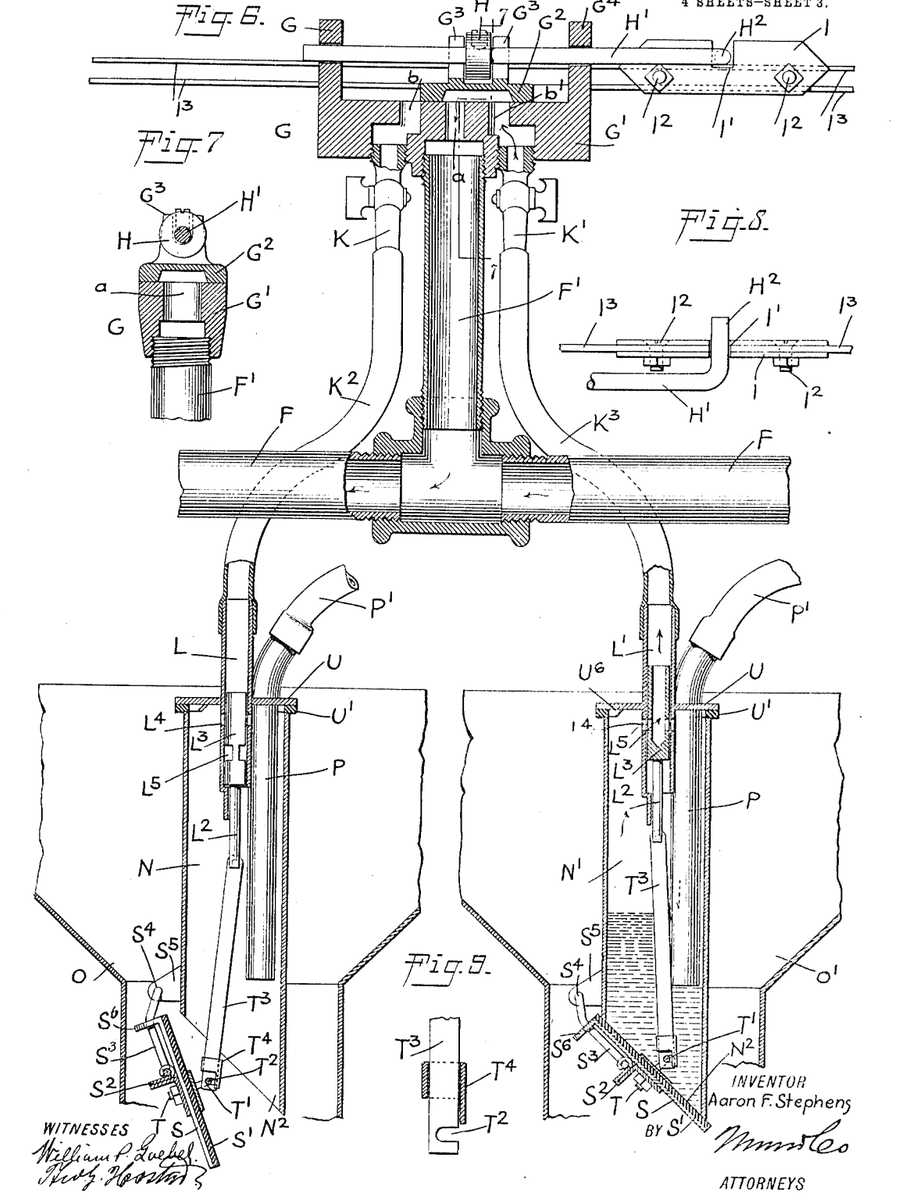
Fig. 6 is an enlarged sectional side elevation of the controlling valve for the vacuum chambers and connected with the main suction pipe.
Fig. 7 is a cross section of the same on the line 7—7 of Fig. 6.
Fig. 8 is a plan view of part of the line wire and the stem of the valve shown in Fig. 6.
Fig. 9 is an enlarged sectional side elevation of the locking sleeve in open position on the link connecting the swing bottom of the suction chamber with the actuating piston.

The milking apparatus is driven from a main shaft A connected with an engine or other suitable means for imparting a rotary motion to the said shaft A, which latter is connected by an eccentric B with an air pump C, of any approved construction, and connected at its suction end by a pipe D with a large suction chamber E, from which the air is exhausted by the pump C. The chamber E is connected with a main suction pipe F extending along the several stalls in a stable, as plainly indicated in Fig. 1, and the said main suction pipe F is provided at intervals with branch pipes $F'$ each connected with a valve G for controlling the suction pipes for four cows at a time. The valve G (see Figs. 6, 7 and 8) is provided with a valve casing $G'$ having a central port $a$ connected with a branch pipe $F'$ and side ports $b$, $b'$ adapted to connect with the atmosphere, the said ports $a$, $b$ and $b'$ being controlled by a slide valve $G^2$ provided with lugs $G^3$ between which extends a collar H secured to a stem $H'$ mounted to slide in bearings $G^4$ forming part of the valve body $G'$. The valve stem $H'$ is provided at one end with an angular offset $H^2$ adapted to engage a notch $I'$ in a block I, preferably made in sections, and fastened by bolts $I^2$ to rods or stiff wires $I^3$ extending along the stalls, as indicated in Fig. 1, one end of the rods $I^3$ being connected to one end of a cross arm $I^4$ secured on the lower end of a vertically-disposed shaft $I^5$ journaled in suitable bearings arranged in the stable, as indicated in Fig. 1. The other end of the arm $I^4$ is connected by a link J with a slide $J'$ mounted to slide on a frame $J^2$ attached to a suitable support $J^3$, and on the slide $J'$ are journaled spaced friction rollers $J^4$ in engagement with the peripheral face of a cam $J^5$ secured on a shaft $J^6$ connected by pulleys $J^7$, $J^8$ and a belt $J^9$ with the shaft A so that a continuous rotary motion is transmitted from the shaft A to the shaft $J^6$ and the cam $J^5$. The rotary motion of the cam $J^5$ imparts an intermittent sliding movement to the slide $J'$ to rock the cross bar $I^4$ and shaft $I^5$ thus imparting a reciprocating movement to the rods $I^3$ which by the block I imparts a reciprocating motion to the stem $H'$ and the slide valve $G^2$ to alternately connect the ports $b$, $b'$ with the port $a$ and with the atmosphere. Thus as shown in Fig. 6 the slide valve $G^2$ is in its extreme position to the right so that the port $b$ is opened to the atmosphere while the port $b'$ is in communication with the port $a$ to produce a suction in the port $b'$. When the valve $G^2$ is shifted to the left then the port $b'$ is opened to the atmosphere while the port $b$ is connected with the port $a$ and the suction pipe $F'$ to produce a suction in the said port $b$. The ports $b$ and $b'$ are connected with manually-controlled valves K and $K'$ connected by flexible pipes $K^2$, $K^3$ with cylinders L, $L'$ attached to the tops of the vacuum chambers N and $N'$ adapted to be suspended in milk cans or other milk receiving receptacles O, $O'$ for receiving milk.

Into each of the suction chambers N, $N'$ extends a delivery pipe P connected by a hose $P'$ with a pipe fixture $P^2$ having two branch pipes $P^3$, $P^4$ each provided with a valve $P^5$ and connected by a flexible pipe $P^6$ with a nipple $Q'$ of a suction cup Q (see Figs. 1, 2 and 5) provided with four suction nipples $Q^2$ each of which is connected by a flexible pipe $Q^3$ with the lower end of a teat cup R (see Figs. 1, 2, 3 and 4) adapted to engage one of the teats of the cow's udder. When a vacuum is produced in a suction chamber N or $N'$ the milk accumulates therein until the vacuum in this chamber is broken to allow the milk to discharge from the chamber into the corresponding milk receiving receptacle O or $O'$, as hereinafter more fully explained.

Figures 10, 11, 12, 13:
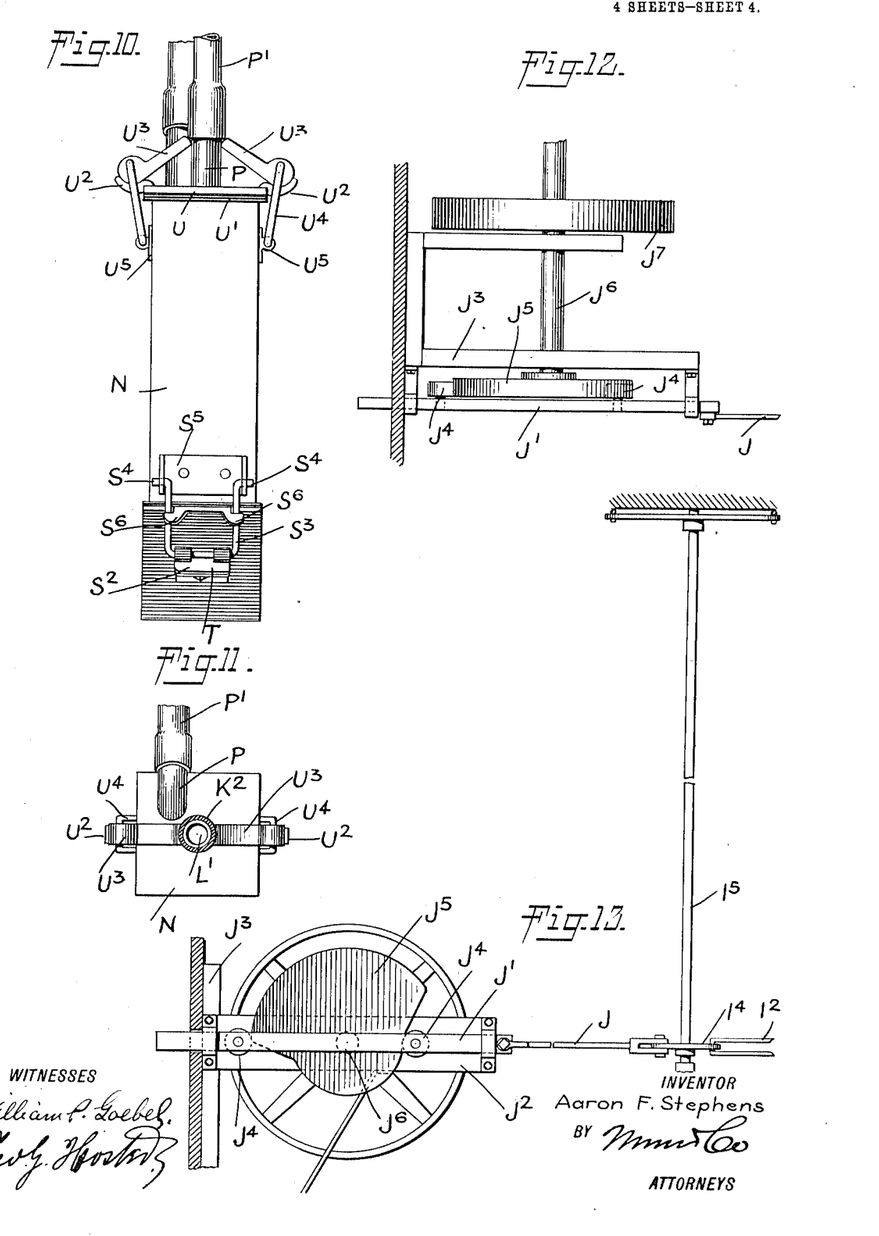
Fig. 10 is an elevation of the suction chamber.
Fig. 11 is a plan view of the same, the suction pipe being shown in section.
Fig. 12 is a plan view of the actuating mechanism for the valves.
Fig. 13 is a side elevation of the same.

It is understood that as each receptacle N or $N'$ connects with two cows, it is evident that the milking of four cows is controlled from one valve G, but the milking of any one cow can be cut out by closing the corresponding valve $P^5$ or $P^6$ on the branch pipes $P^3$ or $P^4$ of the pipe fixture $P^2$. Each of the suction chambers N and $N'$ is open at the lower end $N^2$, and this end is preferably beveled and is adapted to be closed by a swing bottom S provided with a facing $S'$, of rubber or other suitable material, for hermetically closing the lower end $N^2$ of the chamber N or $N'$ at the time the swing bottom S is in a closed position, as shown in Fig. 6. The swing bottom S is provided on its outer face with a bracket $S^2$, on which is pivoted a U-shaped link $S^3$ having trunnions $S^4$ engaging bearings $S^5$ fixed on the outside of the corresponding suction chamber N or $N'$ (see Figs. 6 and 10). Lugs or hooks $S^6$ are attached to the swing bottom S at the upper end thereof and loosely engage the side arms of the U-shaped link $S^3$, so that the swing bottom S is free to swing on the bearings $S^5$ into open and closed position and has a limiting swinging motion on the link $S^3$ to insure accurate seating of the swing bottom, as plainly indicated to the right in Fig. 6. The bracket $S^2$ is fastened to the swing bottom by a bolt T extending to the inner face of the facing $S'$ and terminating in a loop $T'$, engaging a notch $T^2$ formed in the lower end of a pitman $T^3$ extending upwardly within the corresponding suction chamber N or $N'$ and connecting at its upper end with a piston rod $L^2$ of a piston $L^3$ mounted to reciprocate in the corresponding cylinder L or $L'$. The cylinder L or $L'$ is provided with ports $L^4$ adapted to register with ports $L^5$ formed in the piston $L^3$, the upper portion of which is hollow, so that when the piston $L^3$ is in uppermost position, as shown to the right in Fig. 6, then the ports $L^4$ and $L^5$ are in register with each other and at the time when the swing bottom S is in closed position, so that the air is drawn out of the chamber N or $N'$. When the piston $L^3$ is in lowermost position, as shown to the left in Fig. 6, then the ports $L^4$, $L^5$ are out of register and the swing bottom S is in open position to permit the milk to pass from the suction chamber N or $N'$ into the milk receiving receptacle O or $O'$. A sleeve $T^4$ is mounted to slide on the lower end of the pitman $T^3$ to cover the notch $T^2$ so as to prevent accidental disengagement of the pitman from the loop $T'$ and to permit of disconnecting the pitman $T^3$ from the said loop $T'$ at the time the sleeve $T^4$ is moved upward by the operator (see Fig. 9) to allow of readily disassembling the parts for cleaning or other purposes.

The upper end of the suction chamber N or $N'$ is normally closed by a removable cover U, provided with a rubber facing $U'$ for hermetically closing the said upper end of the chamber N or $N'$. The cover U is provided at opposite sides with lugs $U^2$ (see Fig. 10) engaged by cam levers $U^3$ mounted to swing on links $U^4$ fulcrumed on brackets $U^5$ attached to the sides of the suction chamber N or $N'$. By the use of the cam levers $U^3$ the cover U can be moved firmly in position on the top of the suction chamber N or $N'$ to hermetically seal this upper end, and by the use of the cam levers $U^3$ the cover U can be unlocked and removed from the suction chamber N or $N'$ for cleaning or other purposes. The cover U is provided at its under side with lugs $U^6$ fitting against the inner face of the corresponding suction chamber to hold the cover against lateral movement.

The suction cup Q is provided with a removable bottom $Q^4$ and a packing ring $Q^5$ for hermetically closing the under side of the said cup. The bottom $Q^4$ is held in place on the cup by locking catches $Q^6$ pivoted on the bottom $Q^4$ and made U-shape in cross section to straddle the outer edge of the bottom and a flange $Q^7$ exteriorly on the lower end of the cup Q. By the arrangement described the cup can be readily opened for cleaning purposes.

Figures 2, 3, 4, 5:
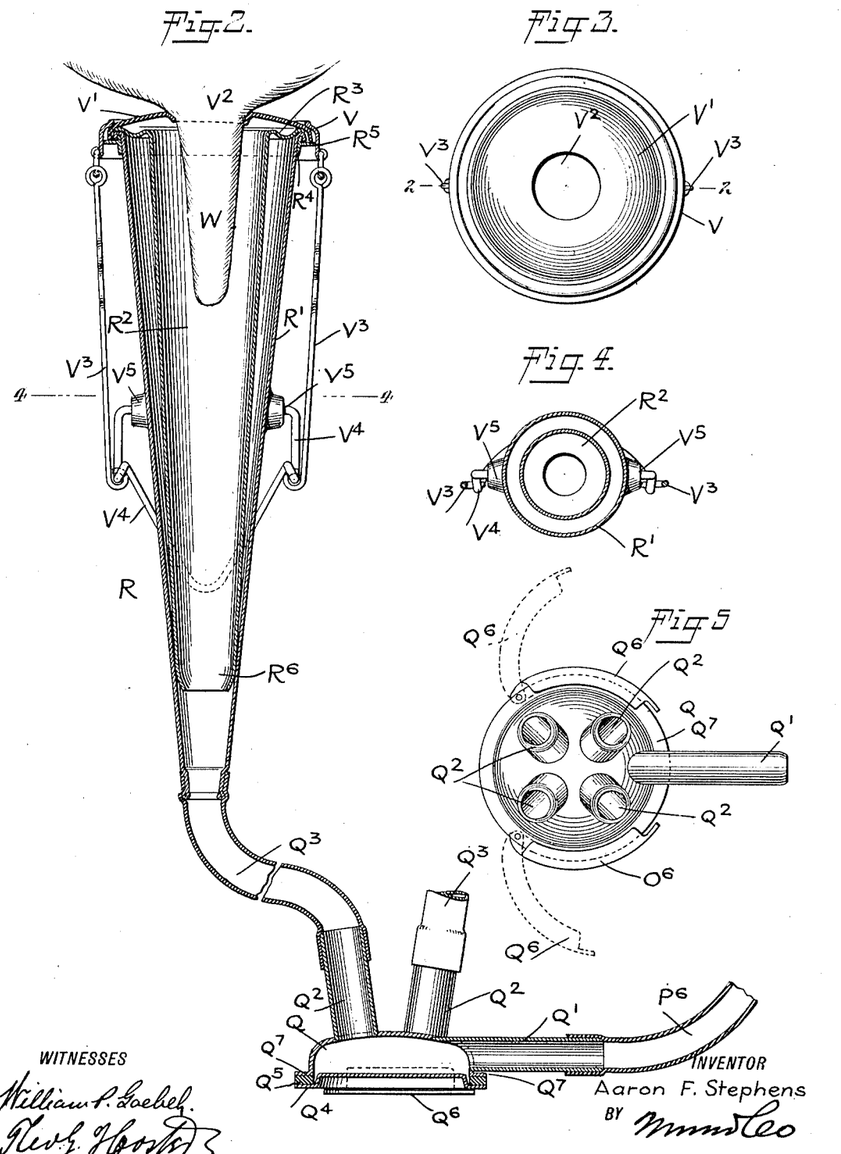
Fig. 2 is an enlarged sectional side elevation of one of the teat cups connected with one of the suction cups, the section being on the line 2—2 of Fig. 3.
Fig. 3 is a plan view of the teat cup.
Fig. 4 is a sectional plan view of the teat cup on the line 4—4 of Fig. 2.
Fig. 5 is a plan view of the suction cup.

Each of the teat cups R is arranged as follows, special reference being had to Figs. 2, 3 and 4: Within an inverted conical shell $R'$ is placed a similar but smaller conical tube $R^2$ provided at its upper end with an outwardly-extending flange $R^3$ seated on a seat $R^4$ formed on the upper end of the shell $R'$. The shell $R'$ is further provided at its upper end with an outwardly-extending flange $R^5$, over which extends a closing ring V provided with a rubber diaphragm $V'$ having a central opening $V^2$ for the passage of the teat W, as plainly indicated in Fig. 2, the diaphragm $V'$ being in contact at its edge with the seat $R^5$ and being stretched over the flange $R^3$ so as to form a hermetical closure for the upper end of the shell $R'$, and the tube $R^2$, at the time the diaphragm engages the teat W. The closing ring V is pivotally connected at its sides by links $V^3$ with a lever $V^4$ fulcrumed at $V^5$ on the outer side of the shell $R'$ so that the closing ring V and its diaphragm $V'$ can be firmly drawn downward on swinging the lever $V^4$ into lowermost position, as indicated in Fig. 2. On swinging the lever $V^4$ upwardly the ring V and the diaphragm $V'$ are raised and lifted off the shell $R'$ and the tube $R^2$ to allow of swinging the closing ring V and its diaphragm $V'$ to one side for the removal of the tube $R^2$ from the shell $R'$ to allow convenient cleaning of the several parts. The lower rounded-off end $R^6$ of the tube $R^2$ fits snugly into the lower end of the shell $R'$ so that when the several parts are assembled and the teat W is engaged with the opening $V^2$ then a suction produced in the cup Q produces a suction in the tube $R^2$ and the teat W to draw the milk from the udder. The lever $V^4$ is preferably provided in its upper portion with corrugations $V^3$ to render this upper part yielding in the direction of its length to insure a firm seating of the ring V and its diaphragm $V'$ on the shell $R'$ and the tube $R^2$.

The operation is as follows: When the several parts are connected up as shown in Fig. 1, and the shaft A is running, then a suction is produced in the main suction pipe F and the slide valve $G^2$ is caused to reciprocate so as to alternately connect each suction chamber N or $N'$ with the branch pipe $F'$ and the atmosphere. When the slide valve $G^2$ is in the position shown in Fig. 6, the suction chamber N is open at the bottom while the suction chamber $N'$ is closed, and milk is drawn into the said suction chamber by way of the pipe P, tube $P'$ and connections, to the suction cups Q and teat cups R of one pair of cows (not shown), and when the valve $G^2$ is shifted to the left and the port $b'$ is uncovered and opens to the atmosphere then air can pass through the port $b'$ into the valve $K'$ and by way of the tube $K^3$ into the cylinder $L'$ and from the latter by way of the registering ports $L^5$, $L^4$ into the suction chamber $N'$ to break the vacuum therein, so that the piston $L^3$ slides downward to permit the swing bottom S to swing into an open position and thus allow the milk to pass from the suction chamber $N'$ into the milk receiving vessel $O'$. When the valve $G^2$ reaches its left-hand position then the port $b$ is connected with the port $a$ and a suction action is now produced by way of the valve K and tube $K^2$ in the cylinder L whereby the piston $L^3$ is drawn upward in the cylinder L, and in doing so the piston imparts an upward swinging motion to the swing bottom S to close the lower end $N^2$ of the suction chamber N. When this takes place the ports $L^5$ have moved in register with the ports $L^4$ so that air is withdrawn from the now closed suction chamber N and consequently a suction is produced in the pipe P, tube $P'$ and the connections leading to the suction cups Q and the cups R to draw the milk from a pair of cows, of which one is shown in Fig. 1. The drawn milk passes into the suction chamber N and when the valve $G^2$ next moves to the right-hand position the vacuum is broken in this chamber N and the swing bottom S swings open to allow the milk to pass from the chamber N to the milk receiving receptacle O. When this takes place the other suction chamber $N'$ is closed to draw in another portion of milk from the other pair of cows, and the above-described operation is then repeated, that is, the milk from the two pairs of cows is alternately drawn into the suction chambers N and $N'$ and discharged from the same into the milk receiving receptacles O and $O'$ until the cows are milked dry. When the two pairs of cows are milked dry the operator takes hold of the angular arm $H^2$ of the valve stem $H'$ and swings the same upward out of engagement with the notch $I'$ so that the valve G is thrown out of action and the operator then closes the valves K and $K'$ to shut off the suction action from the suction chamber N and $N'$.

It is understood that when it is desired to milk but a single cow of a pair it is only necessary to close the corresponding valve $P^5$ or $P^6$ so as to cut out the corresponding suction cup Q and teat cups R.

In order to work the valves G in other stalls of the stable, the upper end of the shaft I⁵ is provided with a cross arm X connected by a link X' with a cross arm X² on the upper end of a vertical shaft X³ provided at its lower end with a cross arm X⁴ connected with the rods I³, the same as above described in reference to the rods I³ and cross arm I⁴, it being understood that the rods I³ are provided with blocks I for controlling the valves G along the other stalls. Each cross arm I⁴, X⁴ is connected by a rod I⁶ with a cross arm similar to the cross arms I⁴ and X⁴ but located at the other end of the stalls so as to insure a proper forward and backward movement of the rods I³ and the blocks I employed for operating the valves G.

By arranging the parts in the manner described they can be readily assembled and disassembled for cleaning or other purposes to maintain the milking apparatus at all times in a sanitary condition.

By the intermittent suction action the milk is more readily drawn from the udder, as the milk has time to pass to the teats and into the teat cups, and it is believed that this action is less strenuous on the cow.

Having thus described my invention, I claim as new and desire to secure by Letters Patent:

1. A milking apparatus, comprising a suction chamber having a movable closure for opening and closing the chamber, a connection adapted to connect with the teats and discharging into the said suction chamber, a vacuum chamber, a main suction pipe connected with said vacuum chamber, a controlling valve, a pipe connection controlled by said valve for connecting the suction chamber alternately with the main suction pipe and with the atmosphere to produce a suction in the said suction chamber for drawing in the milk and admitting air to the said suction chamber and thereby opening the said closure to discharge the milk from the chamber, and means in the said pipe connection and connected with the said movable closure, the said means being controlled by the exhaust of the air from the suction chamber to move the said closure into closed position.

2. A milking apparatus, comprising a suction chamber adapted to be connected with the teats for drawing the milk into the suction chamber, the latter having a hinged bottom adapted to open for discharging the milk into a milk receiving receptacle, suction means, and a reciprocating valve controlling the suction means for alternately producing a suction in the said chamber and teats and admitting air to the chamber to break the vacuum and to open the closure.

3. A milking apparatus, comprising a main suction pipe, a suction chamber having a movable outlet, a connection adapted to engage the teats of a cow's udder and discharging into the said suction chamber, a pipe connection connected with the suction chamber, a valve for connecting the said pipe connection alternately with the main suction pipe and the atmosphere, and means movable in the said pipe connection and controlled by the admission and exhaust of the air, the said means being connected with the said movable outlet for operating the same.

4. A milking apparatus, comprising a main suction pipe, a valve casing having ports of which one is adapted to lead to the atmosphere and the other connects with the said main suction pipe, a slide valve for alternately connecting the first mentioned port with the atmosphere and with the second mentioned port, means for reciprocating the said slide valve, a suction chamber having a swing bottom for discharging the milk from the said chamber, a connection adapted to connect with the teats and discharging into the said suction chamber, a cylinder having a port opening into the said suction chamber, a piston in the said cylinder controlling the said port, a pipe connecting the said cylinder with the said first mentioned port of the valve casing, and a pitman connecting the said piston with the said bottom.

5. A milking apparatus, comprising a main suction pipe, a valve casing connected with the said main suction pipe and having a port, a controlling valve for connecting said port with the atmosphere and with the suction, a suction chamber adapted to be suspended in a milk receiving receptacle and connected with the said valve casing at said port, the said suction chamber having a pressure-controlled outlet mounted to swing into open and closed position and adapted to open at the time the said port is open to the atmosphere and to close at the time the said port is connected with the suction pipe to place the suction chamber in communication with the suction, a suction cup connected with the said vacuum chamber, and means connecting the said suction cup with the teats of the cow's udder.

6. A milking apparatus, comprising a main suction pipe, a valve casing connected with the said pipe and having a port, a controlling valve for connecting the said port alternately with the suction pipe and with the atmosphere, a suction chamber having a swing bottom for discharging the milk into a milk receiving receptacle, a connection between the said suction chamber and the teats of a cow's udder, a pressure-controlled actuating device connected with the said valve casing at said port and with the said suction chamber and connected with the said swing bottom to open the latter when the said port is open to the atmosphere and to close the said swing bottom and place the suction chamber in communication with the suction at the time the said port connects the main suction pipe with the said pressure device.

7. A milking apparatus, comprising a suction chamber adapted to be suspended in a milk receiving receptacle, the said chamber having a swinging bottom for discharging the milk from the suction chamber into the said receptacle, means adapted to engage the teats of a cow's udder and connected with the said suction chamber, a cylinder, having a port opening into the said suction chamber, a piston in the said cylinder controlling the said port and connected with the said hinged bottom to open and close the latter, a main suction pipe, a valve casing connected with the said suction pipe and with the said cylinder, and a valve for alternately connecting the said cylinder with the said main suction pipe and the atmosphere.

8. A milking apparatus, comprising a main suction pipe, a valve casing having ports of which one connects with the suction pipe and the other is adapted to lead to the atmosphere, a slide valve for controlling said ports, having a stem provided with an angular member and adapted to be turned, a reciprocating member having a slot adapted to be engaged by the said angular member of the said valve stem, a suction chamber provided with a swing bottom, a pipe connection connecting the said suction chamber with the said valve casing at the port adapted to lead to the atmosphere, the said slide valve when actuated connecting the said suction chamber alternately with the said main suction pipe and the atmosphere, the said pipe connection having a cylinder provided with a port, a piston in the said cylinder and having a port adapted to register with the said cylinder port, a connection between the said piston and the said swing bottom, teat cups, a suction cup connected with the said teat cups, and a pipe connection connecting the said suction cup with the said suction chamber.

9. A milking apparatus, comprising a main shaft, an air pump driven from the said shaft, a vacuum tank connected with the said air pump to exhaust the air therefrom, a main suction pipe connected with the said tank, an actuating device driven from the said shaft, a valve casing having ports, the said valve casing being connected with the suction pipe at one of said ports, a suction chamber connected with the said valve casing at the other port, a slide valve actuated from the said actuating device and controlling the said ports of the valve casing to alternately exhaust air from and admit air to the said suction chamber, a connection between the said suction chamber and the teats for drawing the milk into the suction chamber during the suction period, a swing bottom for the suction chamber and means controlled by the admission and exhaust of the air and connected with the swing bottom to close the same, and to permit the same to open to discharge milk from the suction chamber.

10. A milking apparatus, comprising a main shaft, an air pump driven from the said shaft, a vacuum tank connected with the said air pump to exhaust the air therefrom, a main suction pipe connected with the said tank, an actuating device driven from the said shaft, a valve casing having a port adapted to lead to the atmosphere, and a port connected with the suction pipe, a suction chamber connected with the said valve casing at the first mentioned port, a slide valve actuated from the said actuating device and controlling said ports to alternately exhaust air from and admit air to the said suction chamber, a connection between the said suction chamber and the teats for drawing the milk into the suction chamber during the suction period, a cylinder in the connection between the valve casing and suction chamber, a swing bottom on the said suction chamber, and a piston in the said cylinder and connected with the said swing bottom.

11. A milking apparatus, comprising a main suction pipe, a valve casing having a central port connected with the suction pipe, and two ports on opposite sides of the central port and adapted to lead to the atmosphere, a slide palve for alternately connecting each of said side ports with the atmosphere and with the said central port, pipe connections connected with the said valve casing at the said ports leading to the atmosphere, a suction chamber connected with each of the pipe connections and each having a movable outlet, pneumatically controlled means in each of the said pipe connections, and connected with the movable outlets to open and close the same, a milk pipe connected with each suction chamber and having branch pipes, a suction cup connected with each branch pipe, and a plurality of teat cups connected with the suction cup and adapted to connect with the teats.

12. A milking apparatus, comprising a main suction pipe, a valve casing having a central port connected with the suction pipe and two ports on opposite sides of the central port and adapted to lead to the atmosphere, a slide valve for alternately connecting each of said side ports with the atmosphere and with the said central port, pipe connections connected with the said valve casing at the said ports leading to the atmosphere, a suction chamber connected with each of the pipe connections and each having a movable outlet, pneumatically controlled means in each of the said pipe connections and connected with the movable outlets to alternately open and close the same, a milk drawing pipe connected with each suction chamber and having branch pipes, a suction cup connected with each branch pipe, a plurality of teat cups connected with the suction cup and adapted to connect with the teats, and manually-controlled valves in the said branch pipes.

13. A milking apparatus, comprising a main suction pipe, a valve casing having a central port connected with the suction pipe and two ports on opposite sides of the central port and adapted to lead to the atmosphere, a slide valve for alternately connecting each of said side ports with the atmosphere and with the said central port, pipe connections connected with the said valve casing at the said ports leading to the atmosphere, a suction chamber connected with each of the pipe sections and provided with a swing bottom, pneumatically controlled means in the said pipe connections and connected with the said swing bottom to alternately open and close the same and to control the flow of air through the said pipe connections, a milk pipe connected with each suction chamber and having branch pipes, a suction cup connected with each branch pipe, and a plurality of teat cups connected with the suction cup and adapted to connect with the teats.

14. A milking apparatus, comprising a suction chamber having a swing bottom, a main suction pipe, a valve casing having a central port connected with the said main suction pipe, and an exhaust port, a slide valve for alternately connecting the exhaust port with the atmosphere and with the said central port, reciprocating means for actuating the said slide valve, a pipe connected with the valve casing at the exhaust port, a cylinder connected with the said pipe and having a port, a suction chamber into which extends the said cylinder and its port, a swing bottom on the said suction chamber, a piston in the said cylinder and having a port adapted to register with the cylinder port, a link connecting the said piston with the swing bottom, and a milk connection connected with the said suction chamber and adapted to engage the teats.

15. A milking apparatus, comprising a suction chamber open at the lower end, the latter being beveled, a bottom adapted to be seated on the said lower end, a link connecting the said bottom with the suction chamber, a pneumatic cylinder on the said suction chamber and provided with a piston, and a pitman connecting the said piston with the said bottom.

16. A milking apparatus, comprising a suction chamber open at the lower end, the latter being beveled, a bottom adapted to be seated on the said lower end, a link connecting the said bottom with the suction chamber, lugs on the bottom and adapted to engage the said link to limit the swinging motion of the bottom on the said link, a pneumatic cylinder on the said suction chamber and provided with a piston, and a pitman connecting the said piston with the said bottom.

17. A milking apparatus comprising a suction cup of inverted cup-shape and having a flange on the lower end and a connecting nipple, a series of pipes connected with the suction cup, a bottom for closing the said suction cup, and locking catches pivoted on the bottom and adapted to engage the outer edge of the bottom and said flange on the lower end of the cup to lock the bottom to the cup.

18. A teat cup, comprising an outer conical shell, an inner conical tube, seated at its base on the base of the said shell, a locking ring, and a rubber diaphragm extending over the base ends of the said shell and tube and locked in place by the said ring, the said diaphragm having an opening for engagement with a teat.

19. A teat cup, comprising an outer conical shell, an inner conical tube seated at its base on the base of the said shell, a locking ring, a rubber diaphragm extending over the base ends of the said shell and tube and locked in place by the said ring, the said diaphragm having an opening for engagement with a teat and a locking lever fulcrumed on the said shell and connected with the said locking ring.

20. A milking apparatus comprising a suction chamber having a swing bottom, means for connecting the suction chamber with the teats, a main suction pipe, means for connecting the said suction chamber alternately with the main suction pipe and the atmosphere, and pneumatically controlled means connected with the swing bottom to open and close the same.

21. A milking apparatus, comprising a suction chamber having a movable outlet, means for connecting the suction chamber with the teats, a main suction pipe, a pipe connection connected with the suction chamber, means for connecting the said pipe connection alternately with the main suction pipe and with the atmosphere, and pneumatically controlled means in the said pipe connection and connected with the movable outlet to open and close the same.

22. A milking apparatus comprising a suction chamber having a movable outlet, means for connecting the suction chamber with the teats, a main suction pipe, means for connecting the said suction chamber alternately with the main suction pipe and the atmosphere, and means controllable by the exhaust of the air from the suction chamber and connected with the movable closure to close the same.

23. A milking apparatus comprising a suction chamber, having a movable outlet, means for connecting the suction chamber with the teats, a main suction pipe, a pipe connection connected with the suction chamber, means for connecting the said pipe connection alternately with the main suction pipe and with the atmosphere, means in the said pipe connection and connected with the said movable outlet, the said means being controlled by the exhaust of the air from the suction chamber to move the said outlet into closed position.

In testimony whereof I have signed my name to this specification in the presence of two subscribing witnesses.

AARON F. STEPHENS.

Witnesses:
E. C. BARKER,
STEPHEN HUBERTUS.